(12) United States Patent
Tanos

(10) Patent No.: US 7,047,771 B2
(45) Date of Patent: May 23, 2006

(54) UNIVERSALLY ADJUSTABLE GUN RACK AND LOCK ASSEMBLY

(76) Inventor: Laszlo Tanos, 450 Tyler Rd., Webster, NH (US) 03303

( * ) Notice: Subject to any disclaimer, the term of this patent is extended or adjusted under 35 U.S.C. 154(b) by 0 days.

(21) Appl. No.: 10/935,208

(22) Filed: Sep. 7, 2004

(65) Prior Publication Data

US 2006/0048551 A1   Mar. 9, 2006

(51) Int. Cl.
*E05B 73/00* (2006.01)
*B60R 7/14* (2006.01)

(52) U.S. Cl. .................. 70/16; 70/18; 70/19; 70/58; 70/62; 70/279.1; 211/8; 211/64; 224/913; 248/551

(58) Field of Classification Search .............. 70/16, 70/18, 19, 58–62, 279.1; 211/4, 5, 8, 64; 224/569, 912, 913; 248/551, 553
See application file for complete search history.

(56) References Cited

U.S. PATENT DOCUMENTS

| 1,500,924 | A | * | 7/1924 | Chadwick et al. ............. 70/18 |
| 1,984,677 | A | * | 12/1934 | Harrington ..................... 70/16 |
| 3,326,385 | A | * | 6/1967 | Pinkerton et al. .............. 211/4 |
| 3,857,491 | A | * | 12/1974 | Townsend et al. ............. 211/8 |
| 4,747,280 | A | * | 5/1988 | Shaw ........................ 70/279.1 |
| 4,949,559 | A | * | 8/1990 | Glines ........................... 70/19 |
| 5,197,309 | A | * | 3/1993 | Del Rosario ................. 70/209 |
| 5,350,094 | A | * | 9/1994 | Morford ...................... 224/551 |
| 5,779,120 | A | * | 7/1998 | Morford ...................... 224/571 |
| 5,833,102 | A | * | 11/1998 | Jacobson ..................... 224/275 |
| 5,887,730 | A | * | 3/1999 | St. George ..................... 211/4 |
| 5,934,112 | A | * | 8/1999 | Rice et al. ..................... 70/18 |
| 5,979,846 | A | * | 11/1999 | Fluhr ......................... 248/200 |
| 6,145,719 | A | * | 11/2000 | Robert ........................ 224/401 |
| 6,427,497 | B1 | * | 8/2002 | Mossberg et al. .............. 70/18 |
| 6,634,530 | B1 | * | 10/2003 | Black ......................... 224/401 |

\* cited by examiner

*Primary Examiner*—Lloyd A. Gall
(74) *Attorney, Agent, or Firm*—William B. Ritchie

(57) ABSTRACT

A gun lock for receiving and clamping a cross-sectional portion of a firearm. A slide bar is provided for mounting the gun lock to a surface in a storage location. A locking assembly slidably mountable to the slide bar is provided. A set screw assembly for releasably locking the locking assembly onto the sliding bar is provided. A set screw and a set screw nut locks the locking assembly onto the slide bar. The set screw is accessible by a hex key through an opening in housing of the apparatus only when the ratchet arm is in the unlocked open position. A pivotably attachable ratchet arm which resembles typical handcuffs is provided that has a plurality of ratchet teeth that enables the gun lock to clamp a wide variety of cross-sectional portions of different weapons. A solenoid has a plunger adapted to engage one of the ratchet teeth of the ratchet arm to lock the rotatable ratchet arm in position around the cross-sectional portion of the weapon to be locked. The solenoid locking assembly is releasable via a switch and can be overridden with key.

2 Claims, 5 Drawing Sheets

UNIVERSALLY ADJUSTABLE GUN RACK AND LOCK ASSEMBLY

FIELD OF THE INVENTION

This invention relates to gun racks and locks, and, more particularly, to gun racks and locks adapted to mount long guns, such as shot gun and rifles.

BACKGROUND OF THE INVENTION

Law enforcement personnel often carry firearms in their vehicles. These weapons, which include shot guns, rifles, assault rifles and other types of long guns, are often stored in a gun lock fastened securely to a gun rack. The gun rack is mounted either horizontally or vertically at an interior location in the vehicle, and generally is mounted in substantially parallel to a planar region serving as the mounting base in the vehicle, such as the floor, a sidewall or the ceiling.

The design of the storing assembly must provide for immediate release of the weapon when needed by the law enforcement officer. Yet, easy access to the weapon can present a problem, for example, if an intruder or other unauthorized person attempted to misappropriate the weapon.

Further complicating the problem is the fact that whereas in the past, law enforcement personnel generally carried only one type of weapon, typically a service revolver. Today, they must have a variety of weapons having considerably differing sizes and configurations. The choice of location at which the weapon is stored in the vehicle varies considerably depending on the type of weapon selected and the geometry of the vehicle.

Storage of such weapons in the home presents the same problems. The weapon must be secure but readily available when needed.

Presently available gun locks or cradles have been designed to accommodate a particular firearm of a preselected size and configuration and to hold the firearm at only one particular location on the weapon such as the fore grip, adjacent to the trigger, etc. Representative of such devices is the stationary gun lock disclosed by Glines, in U.S. Pat. No. 4,881,386. This device has a single clamping arm that locks over the gun barrel. The clamping arm can be retracted either by actuation of a magnetic assembly that retracts a locking pin, or by inserting a key in a keyway to engage a follower and push the locking pin out of its locking position.

Another type of lock is that disclosed by Smith in U.S. Pat. No. 2,316,995 that employs a pair of opposing jaw members to clamp around the barrel of a gun.

Still another such gun lock is disclosed by Pease in U.S. Pat. No. 2,668,645. Pease describes a swingable gun lock that is pivoted into position over a stationary base to clamp a gun securely in place.

A problem with all of these presently available devices is that they are pre-sized to accommodate only one type of firearm.

Further, once affixed, the gun lock cannot be moved relative to its mounting position nor can the lock grab any cross-section of any weapon to achieve one lock that fits all weapons and locking situations. U.S. Pat. No. 5,934,112, issued to Rice et al. on Aug. 10, 1999, discloses a locking gun rack system using a ratchet mechanism that can be locked onto various position of the weapon. However, this reference does not disclose or suggest the advantage of having the locking portion of the device being able to slide relative to the attachment portion of the lock. Further, this device teaches away from the protecting the attachment portion of the gun lock from tampering as the mounting holes 12A are clearly accessible when a weapon is locked into position.

U.S. Pat. No. 5,531,368, issued to Morford on Jul. 2, 1996, discloses a vehicle mountable gun lock that has a mounting rack that can lock a weapon at different locations along a mounting bar via support cradles. One of the cradles is outfitted with a lock. In order to remove the weapon, the locking cradle must be opened and each non-locking cradle released. This is time consuming and expensive due to the number of parts involved. Further, the bar attachment points are not protected from tampering as a consequence of the locked gun lock.

Thus, there is no presently available gun lock sufficiently versatile to hold firearms of a variety of sizes and shapes in the lock that may be slid relative to the mounting track so that its position in the vehicle can be adjusted to the most efficient location for storage and retrieval.

Further, there is no presently available gun lock that has ratchet locking mechanism with a manual override or a gun lock that has a ratchet activatable by a solenoid and also has a manual override. Further, no presently available gun lock has a locking mechanism that slides relative the mounting track that attaches the gun lock to a storage surface.

SUMMARY OF THE INVENTION

It is an aspect of the invention to provide a gun lock that features a ratchet locking mechanism.

Another aspect of the invention is to provide a gun lock that has a ratchet that can be activated by a solenoid.

Still another aspect of the invention is to provide a gun lock that has a manual override.

It is an aspect of the invention to provide a gun lock that can be slid along a mounting track and tightened, wherein the gun lock, once tightened, cannot be moved until the weapon has been removed and the gun lock is in the open position.

Another aspect of the invention is to provide a gun lock that has adjustable ratchet jaws that can grasp a weapon at various cross-sectional positions along the length of the weapon and still achieve effective locking.

It is an aspect of the invention to provide a gun lock that can be held in position along a mounting track via a set screw and nut that cannot be reached once gun lock is in the locked position.

Another aspect of the invention is to provide a gun lock that has a solenoid that can be activated by button positioned at a distance from the gun lock in a hidden and reasonably secure location.

Still another aspect of the invention is to have the manual override to be key activated in the event that the weapon must be removed and no electrical power is available to activate the solenoid.

The foregoing aspects of the invention are achieved by the gun lock of the present invention.

The invention is a gun lock for receiving and clamping a cross-sectional portion of a firearm. A slide bar or track is mountable to a surface in a storage location such as a motor vehicle, home, office, etc. A locking assembly slidably mountable to the slide bar is provided. The locking assembly has a U-shaped base plate having opposing legs with each leg having an opposing slot dimensioned to receive the slide bar. A mating pair of castings is provided. Left and right fixed side plates are also provided. A pivotably attachable ratchet arm having a plurality of ratchet teeth enables the gun lock to clamp a wide variety of cross-sectional portions of weapons having different configurations. Left and right fixed side plates are permanently mounted between opposing legs of the U-shaped base plate. The mating pair of castings are enclosed within the opposing legs of the U-shaped base plate. The pivotably attachable ratchet arm is rotatably attached between said left and right side plates. A solenoid locking assembly is positioned within the mating pair of castings. An electrically activatable plunger is adapted to engage one of the ratchet teeth of the ratchet arm to lock said rotatable ratchet arm in position around the cross-sectional portion of the weapon to be locked. The solenoid locking assembly is releasable via a switch. A manual override assembly is also positioned with the mating pair of castings. A key operated camlock that is connected to the plunger of the solenoid locking assembly via a camlock arm is provided. When the key is turned in one direction, the arm rotates in one direction and the plunger disengages from the ratchet teeth of the ratchet arm. When the key rotates in the other direction, the arm rotates in other direction and one of said ratchet teeth is engaged to again lock the locking assembly. A set screw assembly for releasable locking said locking assembly onto said sliding bar is provided. A set screw and a set screw nut positioned with said mating pair of castings locks the locking assembly onto the slide bar. The set screw is accessible by a hex key through an opening in said mating pair of casting only when said ratchet arm is in the unlocked open position.

These and other aspects of the invention will become apparent in light of the detailed description of the invention which follows.

DESCRIPTION OF THE PREFERRED EMBODIMENTS

Referring to FIGS. 1–5, the universal adjustable gun lock apparatus 10 is shown. Typical the apparatus 10 is mounted to a storage surface. If that storage surface is in a law enforcement officer's vehicle, the ceiling of the vehicle is generally used. However, the apparatus can be mounted vertically as well. Most importantly, the apparatus 10 can be used in any location where it is desired to securely store a weapon.

Figure 5:
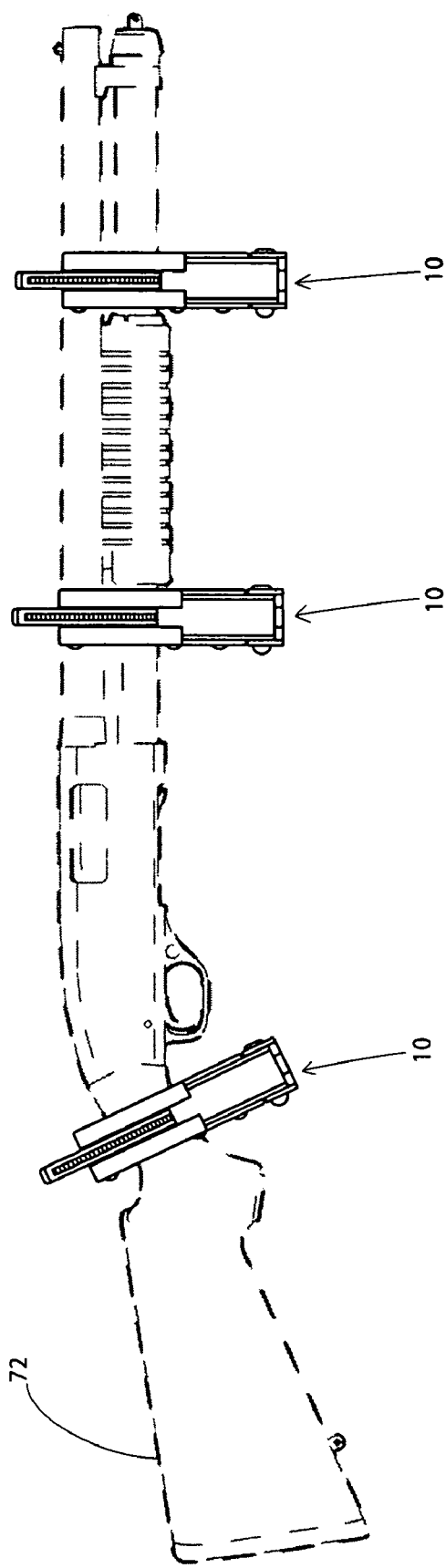
FIG. 5 is side view of the gun lock grasping a typical weapon in different locations along the length of a weapon shown in phantom.

The apparatus 10 comprises mounting slide bar or track 32 and locking assemble 15. Locking assembly 15 is slidably affixed to slide bar 32 and at any desired location and supports the firearm 72 generally parallel to slide bar 32 as shown in FIG. 5. Slide bar 32 is preferably solid steel having a relatively small thickness compared to its width. In this manner, the profile of slide bar 32 is compact thus keeping the weapon close to the surface that it is mounted thereon.

Note that the apparatus can be used at angle relative to the axial length of the weapon that is to be held. Also, the use of a standard butt plate cradle or barrel cradle (neither shown) enables the apparatus to lock the weapon at any convenient location and yet be easily retrieved by unlocking only a single locking assembly 15.

Slide bar 32 is secured to a mounting surface such as a wall or cabinet or a vehicle via retainer plates (not shown), which are well known in the art. To prevent unauthorized removal except with substantial difficulty, the mounting screws used to mount the slide bar 32 via the retainer plates can be the type of screw having a head that can only be tightened, also well known in the art.

Locking assembly 15 comprises a U-shaped base plate 50 that is mounted to a right casting 54 and a left casting 24 via two rivets 56 as shown. Additionally, mounting screws 28 and mounting washers 30 can also be used as an alternative mounting option. Screws 28 are attached in threaded openings provided in the base plate 50.

One half of cavity 26 is provided by left casting 24 and the mating half of cavity 26 is provided by right casting 54. Left casting 24 is substantially a mirror image of right casting 54, with the only difference relating to the manual override assembly, discussed below.

On each leg of base plate 50 is a slot 51 which enables locking assembly 15 to slide along slide bar 32. Molded into left and right castings 24, 54 is set screw receiving cavity 35 which houses set screw assembly 39. As above, one half of cavity 35 is provided by casting 24 and the other half is provided by casting 54. Set screw assembly 39 enables the locking assembly 15 to lock at any desired location along slide bar 32 in order to accommodate various firearms. In use, set screw 36 is mounted through set screw nut 34 and the combination is placed in receiving cavity 35. Set screw 36 is accessed via access hole 37 wherein a hex key may be inserted, when lock assembly 15 is open. If lock assembly is locked around a firearm, then access hole 37 is blocked and the locking assembly 15 cannot be slid along slide bar 32.

Apparatus 15 is assembled with a pivotal ratchet arm 13 which is rotatably attached between opposing side plates 18 using rivets 56. Ratchet arm 13 has a plurality of ratchet teeth 11. Opposing side plates 18 are attached to casting 24, 54 interposed between opposing legs of base plate 50 using rivets 56. Once assembled, apparatus 15 has the appearance of a ratchet type of handcuff which can be easily adjusted to varying diameters in order to accommodate different parts of various weapons. Covering ratchet arm 13 is cushion 12 which is preferably a rubberized material that prevents the weapon from scratched from the metal of arm 13. Similarly, cushions 16 cover the metal side plates 18.

Ratchet arm 13 is made rotatable by attaching arm 13 to side plates 18 using a ratchet arm spacer 14 and a corresponding washer 58 on each side of arm 13 when it is pinned between side plates 18 using rivet 56.

Groove 20 is provided by left and right castings 24, 54 so that arm 13 is held within the castings yet can freely slide when the gun lock is in the unlocked position.

Figure 1:
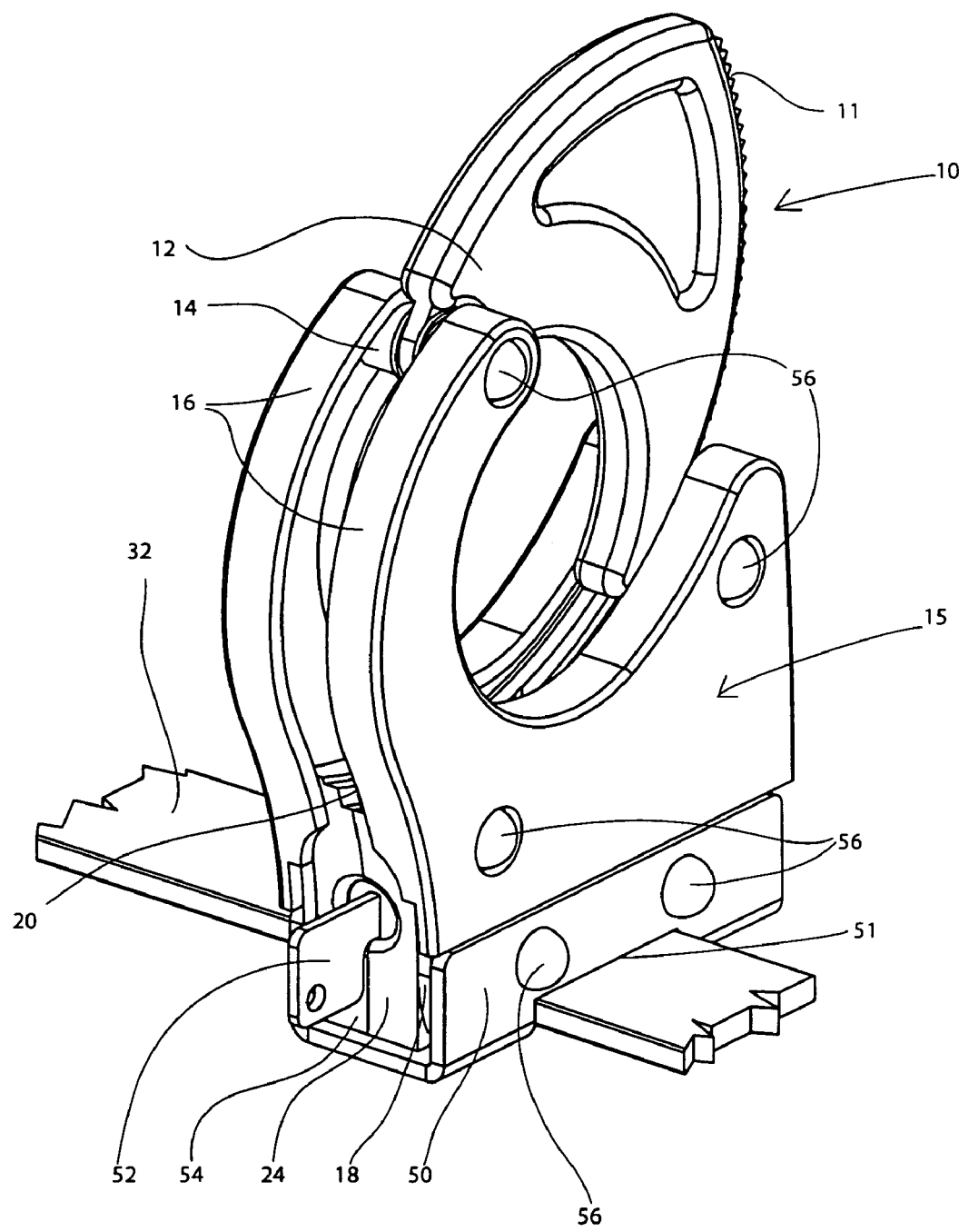
FIG. 1 is an isometric view of the gun lock in accordance with the present invention.
Figure 2:
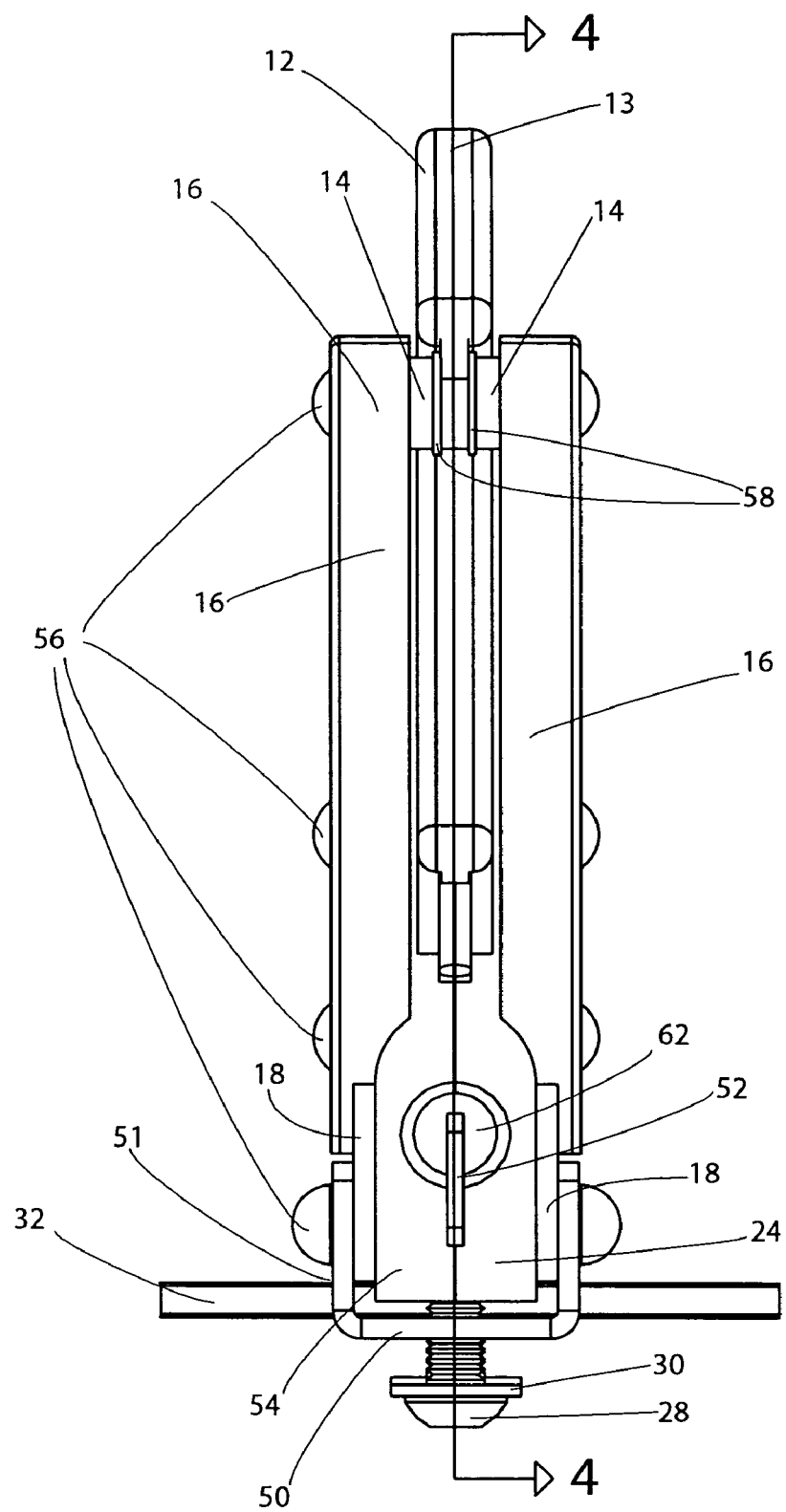
FIG. 2 is a "key side" end view of the gun lock.
Figure 3:
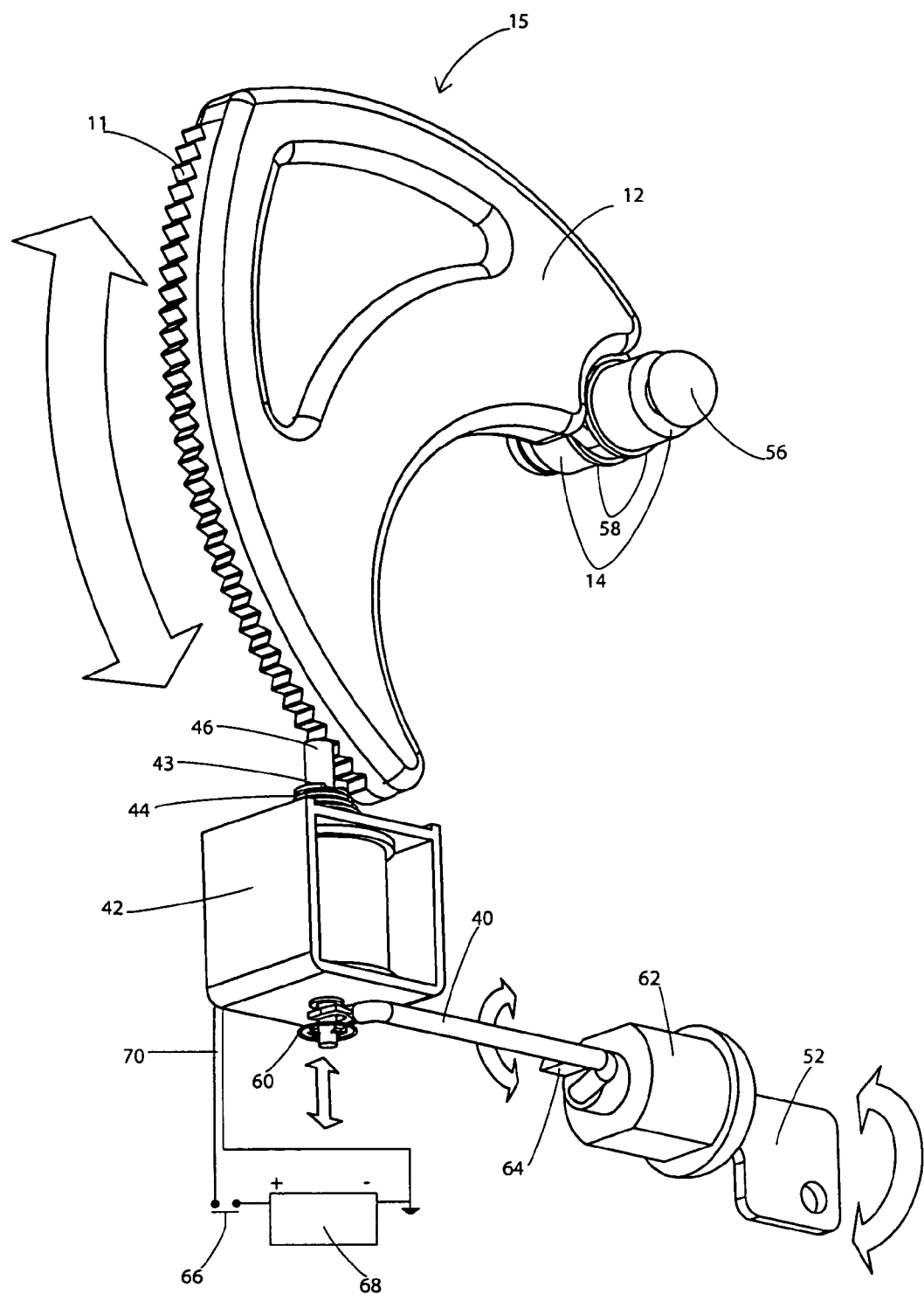
FIG. 3 is an exploded view of the solenoid with key lock manual override mechanism.
Figure 4:
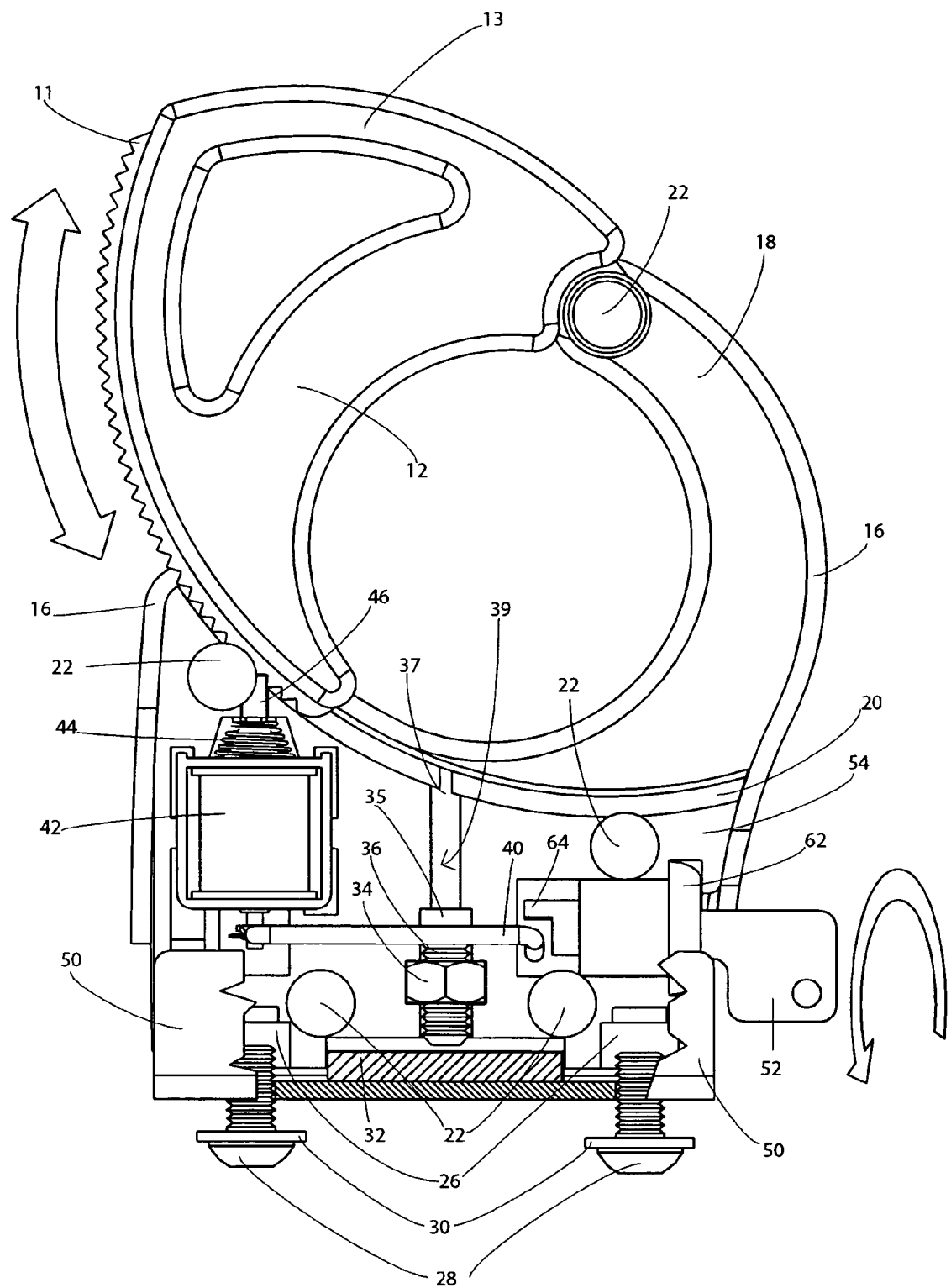
FIG. 4 is a cross-sectional view along section line 4—4 shown in FIG. 2.

To lock locking assembly 15, plunger 46 engages one of ratchet teeth 11, thusly releasably holding arm 13 in that position. Locking assembly 15 may be unlocked electrically using solenoid 42 or mechanically using camlock 62 as shown in FIG. 3.

To use the electrical unlocking feature, push button switch 66 is selected which causes power supply 68 to power solenoid 42 via wires 70. Activating push button switch 66 causes the plunger 46 to disengage from ratchet teeth 11, thus freeing the lock to open. Spring 44 keeps plunger 46 urged against one of ratchet teeth 11 when push button switch 66 is not activated. This causes locking assembly 15 to again become locked. Consequently, an electrical failure causes the device to fail safely by keeping the gun in a locked position.

In the event of a failure of the electrical system, the weapon 72 can still be removed by the manual override system which uses a standard barrel type of camlock 62 activatable by key 52. When key 52 is turned as shown, arm 40 is rotated via camlock activating tip 64. The solenoid end of arm 40 is fitted with a U-shaped end that engages the bottom of plunger 46. Retainer clip 60 is fastened around plunger 46 so that when key 52 is turned, rotating arm 40 causes plunger 46 to move downward, thus releasing the gun lock. Turning key 52 in the opposite direction reinserts plunger 46 into one of ratchet teeth 11 thus locking the gun lock again.

Despite the relative few number of parts comprising the apparatus, invention 10 is able to lock a large variety of weapons having different cross-sectional configurations and in both vertical and horizontal orientations.

While certain representative embodiments of the invention have been described herein for the purposes of illustration, it will be apparent to those skilled in the art that modification therein may be made without departure from the spirit and scope of the invention.

What is claimed is:

1. A gun lock for receiving and clamping a cross-sectional portion of a firearm, said gun lock comprising:
    a slide bar mountable to a surface in a storage location;
    a locking assembly slidably mountable to said slide bar; said locking assembly comprising:
        a U-shaped base plate having opposing legs with each leg having an opposing slot dimensioned to receive said slide bar;
        a mating pair of castings;
        left and right fixed side plates;
        a pivotably attachable ratchet arm having a plurality of ratchet teeth, wherein said left and right fixed side plates are permanently mounted between opposing legs of said U-shaped base plate, enclosing said mating pair of castings therein, and such that said pivotably attachable ratchet arm is rotatably attached between said left and right side plates;
        a solenoid locking assembly positioned within said mating pair of castings comprising an electrically activatable plunger adapted to engage one of the ratchet teeth of said ratchet arm to lock said pivotable ratchet arm in position around the cross-sectional portion of the weapon to be locked therein; such that said solenoid locking assembly is releasable via a switch;
    a manual override assembly positioned with said mating pair of castings comprising a key operated camlock that is connected to the plunger of said solenoid locking assembly via a camlock arm such that when said key is turned, said arm rotates in one direction, said plunger disengages from the ratchet teeth of said ratchet arm and when said arm rotates in the other direction, one of said ratchet teeth is engaged to again lock said locking assembly;
    a set screw assembly for releasable locking said locking assembly onto said sliding bar comprising a set screw and a set screw nut positioned within said mating pair of castings, wherein said set screw is accessible by a hex key through an opening in said mating pair of castings only when said ratchet arm is in the unlocked open position.

2. A gun lock for receiving and clamping a cross-sectional portion of a firearm, said gun lock comprising:
    a slide bar mountable to a surface in a storage location;
    a locking assembly slidably mountable to said slide bar; said locking assembly comprising:
        a U-shaped base plate having opposing legs with each leg having an opposing slot dimensioned to receive said slide bar;
        a mating pair of castings;
        left and right fixed side plates;
        a pivotably attached ratchet arm having a plurality of ratchet teeth, wherein said left and right fixed side plates are permanently mounted between opposing legs of said U-shaped base plate, enclosing said mating pair of castings therein, and such that said pivotably attached ratchet arm is rotatably attached between said left and right side plates;
        a spring activated plunger that engages one of said plurality of ratchet teeth, thereby locking said locking assembly around said firearm;
    a manual locking assembly positioned with said mating pair of castings comprising a key operated camlock that is connected to the plunger via a camlock arm such that when said key is turned, said arm rotates in one direction, said plunger disengages from the ratchet teeth of said ratchet arm and when said arm rotates in the other direction, one of said ratchet teeth is engaged to again lock said locking assembly.

* * * * *